United States Patent [19]
Bradley

[11] 3,735,932
[45] May 29, 1973

[54] SYSTEM FOR OVERCOMING TRANSPORT-PARTICLE-FLOW DEFICIENCIES INHERENT IN FEED GRINDING AND MIXING MACHINES USING DUST COLLECTORS FOR THE GRINDER

[75] Inventor: Richard S. Bradley, Fairmont, Minn.

[73] Assignee: Art's-Way Manufacturing Company Incorporated, Armstrong, Iowa

[22] Filed: Dec. 8, 1971

[21] Appl. No.: 205,877

[52] U.S. Cl. ............................241/60, 241/101 B
[51] Int. Cl. .......................................B02c 13/288
[58] Field of Search..........241/49–51, 55, 56, 59, 60, 241/98, 101 B, 101 M, 186 B

[56] References Cited

UNITED STATES PATENTS

| | | | |
|---|---|---|---|
| 2,815,941 | 12/1957 | Schmale | 241/101 M X |
| 3,606,181 | 9/1971 | Moore | 241/101 M X |
| 3,133,727 | 5/1964 | Luscombe | 241/98 X |
| 3,199,796 | 8/1965 | Callum | 241/60 X |
| 2,289,727 | 7/1942 | Randolph | 241/59 X |

*Primary Examiner*—Donald G. Kelly
*Attorney*—George F. Williamson, Herman H. Bains et al.

[57] ABSTRACT

A new system for overcoming particle-flow deficiencies is readily applicable to most conventional feed grinding and mixing machines now in use by addition and connection of a minimal number of components. Said grinder mixers employ, in addition to the feed mixing mechanism and tank, a grinder, such as a hammermill, having its bottom discharge transport-connected to the lower portion of the feed mixing tank, usually by means of an enclosed screw conveyor. Said combination machines also employ an upstanding dust collector interspersed between the grinder and the screw conveyor and equipped with a power fan to remove the finer comminuted particles and dust from the interior of the grinder and to collect and communicate the same to an intermediate portion of the screw conveyor and into the stream of the larger ground particles. The screw conveyor builds up pressure throughout its length with the result that upward air pressure is applied at the communication point with the depending discharge of the dust collector, producing upward blowout and often clogging. Also, in present machines back pressure is created at the extreme discharge of the screw conveyor into the tank. The new system applies a predetermined degree of suction to the pressure build up area near or at the discharge tube of the dust collector, thereby relieving the accumulated pressure in said conveyor at the point of connection with the dust collector and also at the ultimate discharge of the conveyor into the bottom portion of the mixing tank.

4 Claims, 3 Drawing Figures

Patented May 29, 1973

INVENTOR.
RICHARD S. BRADLEY
BY
Williamson Bains & Moore
ATTORNEYS

Patented May 29, 1973

INVENTOR.
RICHARD S. BRADLEY
BY
Williamson Bains + Moore
ATTORNEYS

SYSTEM FOR OVERCOMING TRANSPORT-PARTICLE-FLOW DEFICIENCIES INHERENT IN FEED GRINDING AND MIXING MACHINES USING DUST COLLECTORS FOR THE GRINDER

This invention relates generally to machinery for uniformly mixing and delivering several selected feed ingredients for livestock and poultry. The modern, widely used mixers are for the most part mobile in nature and in addition to an upright recirculating mixing tank, include a grinding device, such as a hammermill, mounted adjacent said mixing tank together with a dust collector interspersed between the grinder and the inflow feed auger to the tank. A commercially successful, mobile grinder mixer of said general type is disclosed in Luscombe U.S. Pat. No. 3,133,727.

In the operation of said commercial grinder mixers, the grinder, usually a hammermill, is mounted on the main frame of the device a short distance forwardly of the recirculating mixer tank. The larger and heavier ground particles from the grinder pass downwardly through the screen into a longitudinal straight feed auger which communicates with the bottom of the mixing tank. A conventional upright dust collector is mounted between the rear end of the grinder and the mixing tank and employs a fan having its intake communicating with the interior of the grinder housing to draw off the finer particules and dust therefrom and having its tangential discharge connected tangentially with the interior of the dust collector housing. The lower end of the dust collector communicates with the top of the same feed auger which enters the bottom of the mixer tank.

While such combination of grinder-dust collector and recirculating mixing tank have been reasonably acceptable to the purchasers, particularly where heavier cereal kernel material, such as corn and wheat, have been ground, I have discovered that serious inefficiencies are present in the grinding and mixing of all materials and are increasingly objectionable where lighter materials, such as oats, hay and alfalfa, are to be ground as ultimate feed ration ingredients.

I have determined that in attempting to exhaust the collected dust from the bottom of the collector into the generally horizontal feed auger, which conducts ground feed from the bottom of the grinder to the mixing tank, a serious upward back pressure on the dust collector results, substantially restricting communication flow of the collected smaller particles and often blowing finer particles upwardly out of the dust collector. As the ground feed components move from the bottom of the hammermill into the transporting auger, air is admixed with the solid material and the auger itself revolving at high speed compresses the air/feed mixture as it carries it into the mixing tank. In addition, as feed builds up in the mixing tank, at the bottom thereof, backpressure occurs on the auger inlet into the tank due to the cumulative weight of feed in the bottom of the same.

It is an object of my invention to overcome and correct the present, existing inefficiencies of a grinder, dust collector, feed mixer through rather simple but highly efficient changes in the communication and effective connection of the related essential components to relieve accumulating pressure medially of the transporting auger and prevent backpressure at the delivery end of the dust collector and from the delivery end of the auger in the mixing tank.

My invention, without requiring addition of any expensive parts, is responsible for an improved and new flow system which prevents flowback and excess air circulation at the delivery end of the dust collector and simultaneously relieves accumulated pressure in the delivery end of the feeding auger. While accomplishing the foregoing results, my invention nevertheless provides for sufficient air flow out of the grinder housing to prevent back flow or "flowback" at the grinder intake.

The foregoing advantages and objects of the invention will more fully appear in the following description made in connection with the accompanying drawings wherein like reference characters refer to similar parts throughout the several views and in which.

Figure 1:
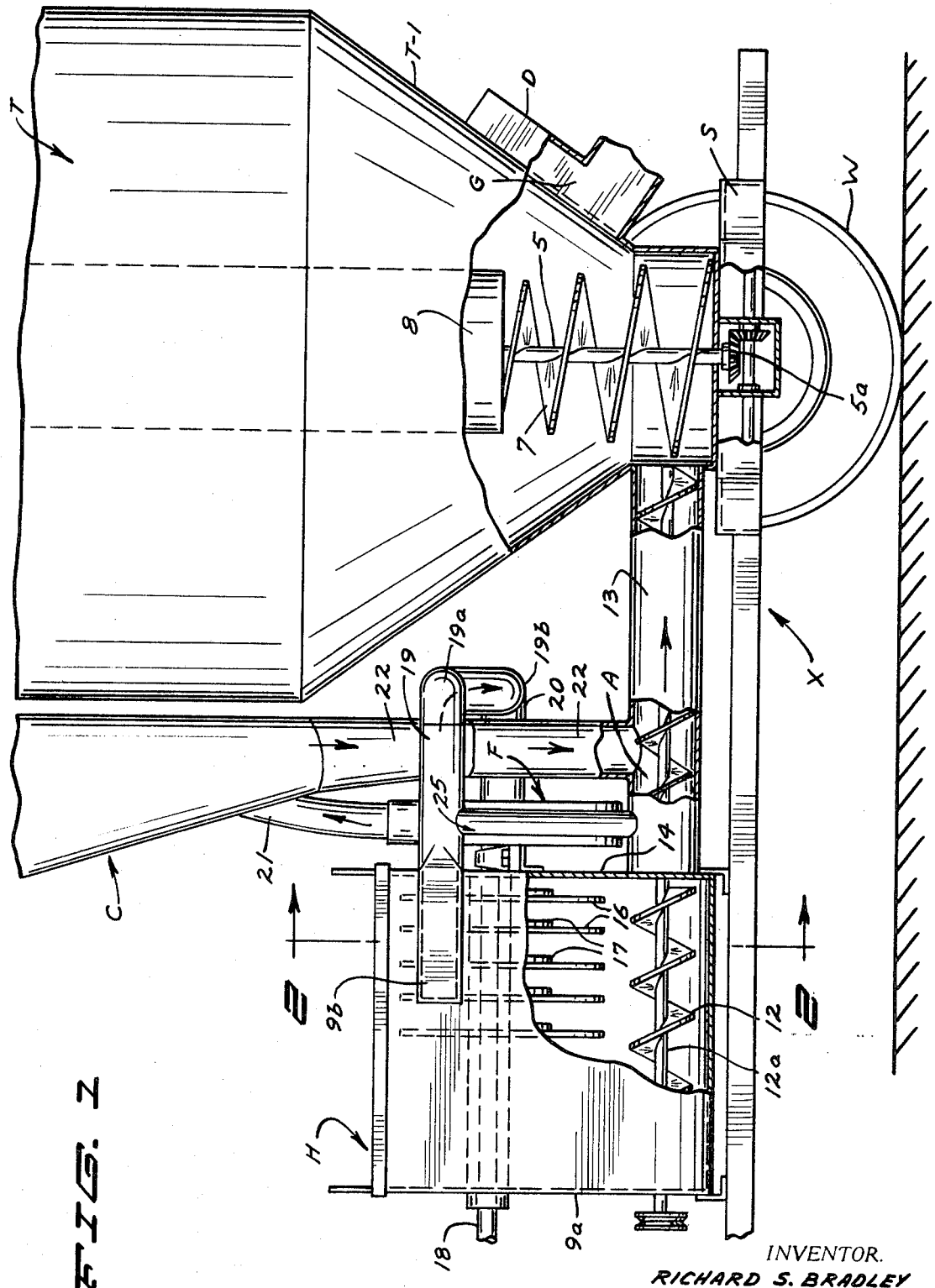
FIG. 1 is a view mostly in side elevation with some portions broken away and shown in section, illustrating an embodiment of my system and apparatus applied to a mobile or sulky type feed mixer combination.
Figure 2:
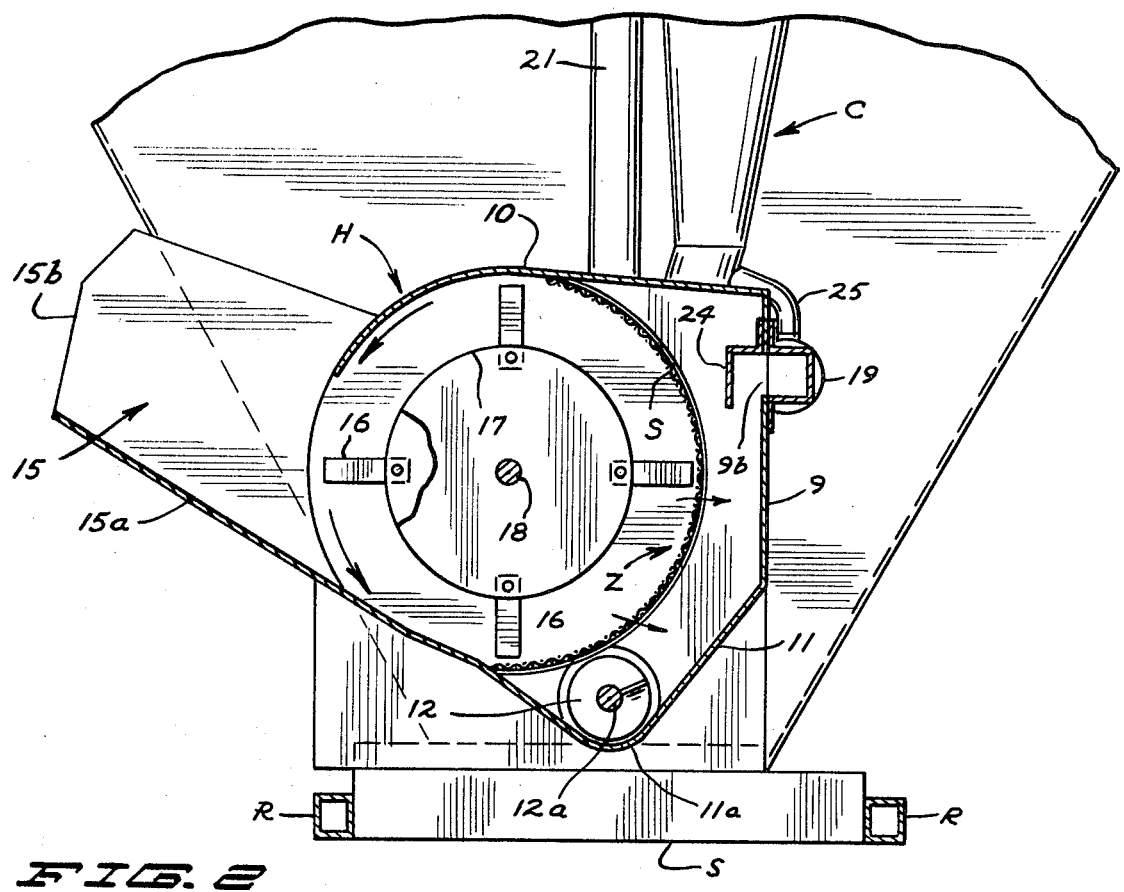
FIG. 2 is a vertical cross section taken along the line 2—2 of FIG. 1.

As shown in FIGS. 1 and 2, the medial and lower portions of a grinder-type, mobile feed mixer are shown, comprising recirculating mixing tank identified as an entirety by the letter T, a grinder in the form of a hammermill H mounted a short distance in front of said tank, and an upstanding dust collector C employing a fan F mounted between the rear of the grinding and the tank.

The mixing maching of tank T and the hammermill H are supported and secured at their lower ends to a generally horizontal frame X supported at its rear end from ground on a pair of wheels W. Frame X comprises a pair of forwardly extending square tubular rails R interconnected at their rear ends with a rectangular, heavy tank support S.

The feed mixer machine mounted in tank T is of conventional structure, comprising a vertical, driven auger shaft 5 mounted axially of the tank T and having beveled gear driving connections 5a with a horizontal power take-off shaft 6 which is mounted in suitable bearings supported from the rails R of the frame X. The auger shaft 5 has fixed thereto a relatively large spiral auger 7 which extends from the lower and diminished portion of tank T throughout the greater part of the height of tank T and at its upper extremity usually has a paddle-type wheel affixed thereto, disposed above a large, vertical, recycling sleeve 8 which surrounds the auger 7 with working clearance and is rigidly supported in vertical position axially of the tank by suitable means, not shown.

The lower portion of tank T, in conventional manner, tapers downwardly to the bottom thereof as indicated by the letter T-1. The lower portion of tank T-1 has a feed mixture discharge D communicating with the interior thereof, and a slidable or other shiftable gate G is mounted on the interior of the discharge opening of the tank, and when closed prevents discharge of material but may be opened at various levels for discharge of the mixed material.

THe grinder, in the form of a hammermill H is of conventional type, employing a housing having a side, straight, perpendicular wall 9, a top wall 10, and as shown, a V-shaped bottom wall 11, the sump 11a thereof extending longitudinally of the housing and providing for accommodation of a high speed feed auger 12, which extends approximately horizontally through the entire length of the housing and then rearwardly through the rigid auger sleeve 13 and thence rearwardly into the forward and bottom portion of the lower, truncated conical portion T-1 of the tank T. The auger includes an axial shaft 12a which projects forwardly from the front wall of the grinder housing and which carries a pulley adapted to be driven by suitable power take-off means, not shown.

The housing of the hammermill includes a front wall 9a, a rear vertical wall 14, and a declined chute 15 communicating with one of the longitudinal sides of the housing and having a bottom 15a and side walls 15b. The grinding elements of the mill are in the form of pivoted hammermill arms 16 pivotally connected at their inner ends with one of a series of rigid discs 17 and as shown, four of said arms being connected with each of discs 17. The discs 17 are keyed or rigidly affixed in the desired spaced relation to a horizontal driven shaft 18 which projects outwardly beyond the forward vertical wall of the grinder housing and which is driven by suitable driving connections with power take-off (not shown).

A heavy screen or grating Z of semi-cylindrical shape, is mounted rigidly, concentric of shaft 18 and the discs 17, being located in the portion of the housing opposite from the intake chute 15, the direction of rotation as indicated in FIG. 2 by the curved arrows.

The ground fragments of material admitted to the grinder housing passing through the screen Z, drop upon the upper portion of the feed auger 12 and with the assistance of the trough-shaped lower sump portion 11a of the bottom of the housing, are transported rearwardly through the heavy auger sleeve 13 and then into the forward lower portion of the tank housing T.

An air-dust withdrawal tube 19 communicates at its forward portion through an elongate, horizontal opening 9b with the interior of the hammermill housing, and as shown in FIG. 1, is smoothly curved at an elbow 19a and then again at an elbow 19b, to communicate with the axial intake 20 of the fan or blower F. It is of advantage in my new and improved system to elongate the opening 9b through wall 9 of the housing and to add an elongate, downturned deflection lip 24 of angular cross section, welded or otherwise supported in the upper portion of the side wall 9, with the lip disposed to deflect air and the finer and ligher particles twirling in a vortex which is set up by reason of the rapid revolution of the hammermill blades and discs. The lip 24 and the elongate communication aperture 9b are disposed to the outer side of screen Z, as clearly shown in FIG. 2.

Figure 3:
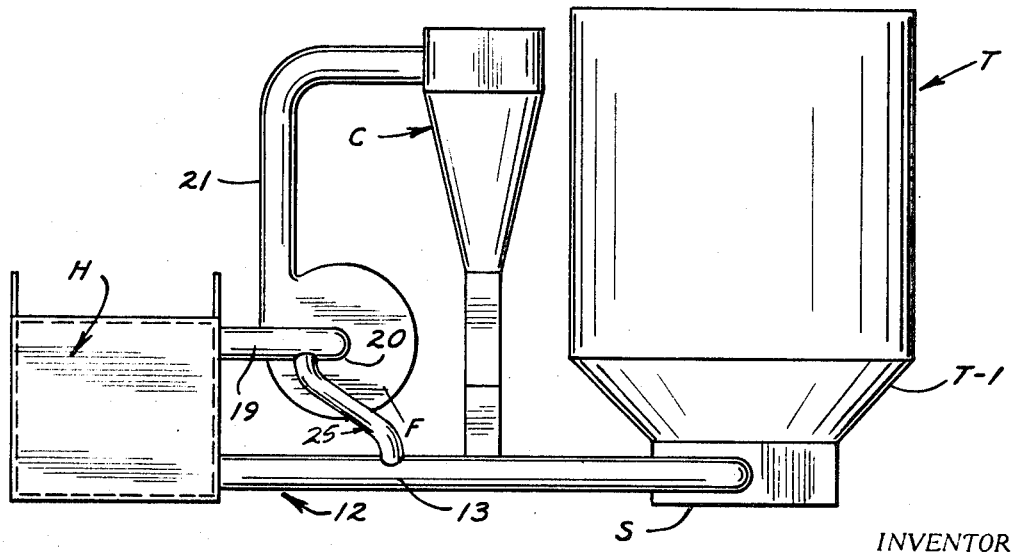
FIG. 3 is a diagrammatical view, included for the purpose of illustrating the entire flow and system.

A fan-discharge duct 21 communicates with the tangential discharge of fan F, and extends upwardly to adjacent the top of the centrifugal dust collector C (not shown in FIGS. 1 and 2, but indicated by the diagram of FIG. 3). The communication is such that the discharged air, entrained dust and finer feed particles are directed tangentially or circumferentially within the upper part of the dust collector in conventional manner. The dust collector has an elongate, depending, axial discharge sleeve 22 which communicates with a medial portion of the feed auger sleeve 13, as shown in FIG. 1. Thus the finer particles and heavier dust collected by collector C through sleeve 22 has communication with the top of the feed auger 12, which moves material rather rapidly to the bottom portion of the interior of the feed mixing tank.

Ground material and such dust as is collected by the screw auger injected into the bottom of the tapered tank portion T-1, and of course in auger action, pass through some of the accumulated mass of feed components in the process of mixing, and thereafter are carried with other feed ration particles upwardly by the recirculating conveyor 7 in the tank, passing axially and vertically to the open end of the recirculating sleeve 8, thereafter flowing out near the top of the tank to fall by gravity upon accumulated mass of particles in the annular portion of the tank surrounding the sleeve 8.

The apparatus, components and dimension and combination of components as described are conventional in modern grinder-dust-collector-feed mixing machines now sold on the current market by a number of different manufacturers.

All of said combination grinder-feed mixer machines have proven to be, to some extent, deficient in moving even heavy material such as kernels of corn, wheat and durham, and such deficiency is greatly increased when the light feed ingredients such as oats, rye, hay and alfalfa are to be ground and subsequently mixed. I have discovered that overall efficiency of the conveying of ground feed material, as well as dust-collected fine particles, is seriously impaired by inherent malfunction of components at at least two areas in the flow and conveying systems.

In itself, the hammermill has fan or blower characteristics and creates a high turbulence within the housing H. The high speed auger 12, throughout its length from the point of the hammermill to the bottom of the tank, compresses air contained therein because of the spiral screw with the result that at the communication area indicated at A in FIG. 1, where the depending end 22 of the dust collector joins the auger sleeve 13, a substantial quantity of compressed air is exhausted forcibly and upwardly through collector discharge 22, substantially interfering with downward discharge of collected finer particles, and where the ground material is very light in specific gravity, causing a vertical blowout through the entire dust collector, with discharge of finer material from the upper open end thereof. Even when heavier material, such as corn, is ground in the hammermill, finer particles and dust desired for the ultimate feed mixture are to some extent blown out and upwardly through the dust collector.

The ground material fed into the bottom of the tank through the remaining coils of the screw conveyor, with entrained air, is also under some pressure when the material enters the bottom of the tank and, of course, such entrained air must outlet in some manner and a back pressure is caused by the mass of the material, some of which has been recirculated, which occupies the bottom portion (and often to a considerable height) of the tank.

In the past I have experimented with different medias and systems for lessening and overcoming the malfunctions of the existing combination machinery, to the end that upward pressure and flow back in the communication area A between dust collector discharge and auger be adequately relieved to prevent flow back or clogging of the collector discharge; and further, to overcome back pressure and blockage at the entrance or delivery end of the auger into the bottom of the tank.

Unexpectedly I have disclovered that a simple and single bypass-moderating tube of a predetermined diameter, having an air intake end properly positioned with reference to the discharge of the dust collector, and having its forward or opposite end connected for induced draft of air with the intake portion for the fan, will accomplish my objectives and very substantially increase the efficiency of the entire feed grinding, dust collecting and feed mixing system.

In the embodiment disclosed, a short tube 25 communicates by a sealed connection with the interior of auger sleeve 13 at an area preferably just forwardly of area A. I prefer to have communication of tube 25 with sleeve 13 at an area spaced from the center of collector discharge 22 and also from grinder housing H equal to one convolution of the auger. The opposite end of tube 25 is connected by sealed joint 25b with the air and dust withdrawal conduit 19 which serves as the intake passage for the powered fan of the dust collector. THe internal diameter of tube 25 which applies suction relief to the discharge of the dust collector is necessarily smaller than the internal diameter of dust withdrawal-fan intake conduit 19 and the proper determination of the internal diameter as well as points of connections of its ends become critical.

In such determinations the quantity displacement and speed of air travel through tube 25 into fan intake 19 must not be of such magnitude as to effect withdrawal of dust-laden air from the interior of the hammermill. However, withdrawal of air and dust from the discharge of the dust collector above area A of the auger must be adequate to overcome and nullify the build up of air pressure at the area A (FIG. 1), due to the fast revolution of the auger 12.

By knowing or computing the flow rate of the discharge of the fan to maintain a dust transport velocity of about 2,500 feet per minute from the hammermill will give adequate transport of dust required. The fan having an output in excess of 2,500 feet per minute velocity may be used for bypass-relief-pressure purposes.

In taking a hypothetical case which I successfully solved, the fan had an output of approximately 210 cubic feet per minute and in my calculations I divided this so that the output from the hammermill was 125 cubic feet per minute and the bypass through tube 25 then should take 85 cubic feet per minute. This was done by using a 3 inch internal diameter conduit 19 from the hammermill and a pressure relief tube 25 of 2½ inch diameter. In this test I was able to maintain a dust-transport velocity of 2,500 feet per minute in both places.

The following formula for computing pipe diameter is correct and effective, to wit:

$$Q = AV$$

Where $Q$ is the flow rate in cubic feet per minute;

Where $A$ is the cross sectional area in square feet of the tube; and

Where $V$ is the velocity of feet per minute.

What is claimed is:

1. A system for overcoming particle-flow deficiencies in a conventional grinder-mixer for feed rations, of the type having mixing mechanism mounted within a tank,
    an adjacent grinding device,
    an enclosed conveyor for transporting ground feed particles from said grinder to the interior of said tank,
    a conventional dust collector having a fan provided with an intake conduit communicating with the interior of said grinder to withdraw the finer particles therefrom,
    said fan having a discharge communicating with the upper portion of said dust collector; and
    said dust collector having a depending discharge connected in open communication with said enclosed conveyor intermediately of the position of said grinder and said mixing tank,
    said system comprising means actuated by the air-flow pattern of said fan-intake for relieving pressure built up at the communication area between said collector discharge and said enclosed conveyor.

2. The combination and system defined in claim 1 wherein said last-mentioned means comprises a conduit having a substantially sealed communication at one end with the intake of said fan and having sealed communication in its opposite end with said conveyor in an area close to the inflow communication between said collector discharge and said enclosed conveyor.

3. The combination and system defined in claim 1 further characterized by said means comprising a conduit of smaller diameter than the intake conduit for said fan communicating at one end with the intake of said fan and communication at the opposite end with the enclosure of said conveyor at an area adjacent the communication area of said collector discharge and said enclosed conveyor.

4. The structure and combination set forth in claim 1 wherein said enclosed conveyor comprises a sleeve having operating therein a screw or auger conveyor, and
    wherein for accomplishment of the invention purposes hereof a tubular element is employed with one of its ends connected to the fan intake of said dust collector and wherein the opposite end thereof is connected in sealed relation with the interior of said enclosed conveyor at a point slightly upstream of said communication intake with the depending discharge of said dust collector.

* * * * *